United States Patent Office 3,408,396
Patented Oct. 29, 1968

3,408,396
α-CYCLOHEXYL-3,4-DISUBSTITUTED-PHENYL ACETAMIDES
John T. Suh and Claude I. Judd, Mequon, Wis., assignors to Colgate-Palmolive Company, New York, N.Y., a corporation of Delaware
No Drawing. Filed Oct. 22, 1965, Ser. No. 502,559
4 Claims. (Cl. 260—559)

ABSTRACT OF THE DISCLOSURE

The compounds are α-cycloalkyl and α-heterocyclic-3,4-disubstituted phenylacetamides useful as antihypertensive agents. Among the compounds disclosed are α-cyclohexyl-3,4-dimethoxyphenylacetamide and α-cyclohexyl-3,4-dibenzyloxy-phenylacetamide.

---

The present invention relates to novel α-cycloalkyl and α-heterocyclic-3,4-disubstituted-phenylacetamides and reduction products thereof, novel intermediates associated with the preparation of these compounds, processes of producing the intermediates and the final compounds, and the pharmacologic and therapeutic uses for such compounds.

The novel compounds of the present invention have the formulae

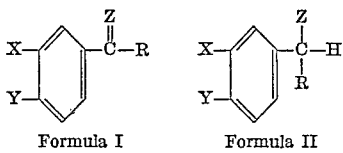

Formula I       Formula II in which X and Y are hydrogen, hydroxy, alkoxy such as methoxy, ethoxy and propoxy, aralkoxy such as benzyloxy, halogen and $CF_3$; R is —CN,

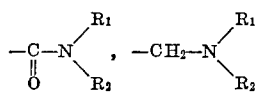

$R_1$ and $R_2$ are hydrogen, lower alkyl of 1 to 8 carbon atoms, an aryl such as phenyl or a nuclear substituted phenyl, a cycloalkyl of 3 to 7 carbon atoms, an aralkyl such as benzyl, or a cycloalkyl-lower alkyl such as cyclohexyl-methyl; Z is a cycloalkyl of 3 to 7 carbon atoms, or a saturated heterocyclic ring system such as piperidyl, pyrrolidinyl, tetrahydrofuryl, tetrahydropyranyl, tetrahydrothiophenyl, azacycloheptyl or thiacycloheptyl, in which there is at least 1 carbon atom located between the heterocyclic atom and the position of attachment.

The preferred methods of preparing the novel compounds of the present invention employ as a starting material a 3,4-disubstituted - phenylacetonitrile of the formula

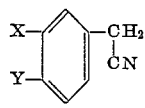

in which X and Y have their previously assigned values.

One such starting material which is readily available is 3,4-dimethoxyphenylacetonitrile.

The compounds of Formula I in which R is cyano and Z is cycloalkyl may be prepared by first treating a 3,4-disubstituted - phenylacetonitrile with cycloalkyl ketone, such as cyclohexanone, in the presence of a suitable catalyst such as sodium ethoxide. The resulting cycloalkylidene-3,4 - disubstituted - phenylacetonitrile may then be treated with hydrogen in the presence of a suitable catalyst such as 10% palladium on carbon to form the corresponding cycloalkyl-3,4-disubstituted-phenylacetonitrile.

The following diagram which shows the preparation of specific compounds will serve to illustrate the process:

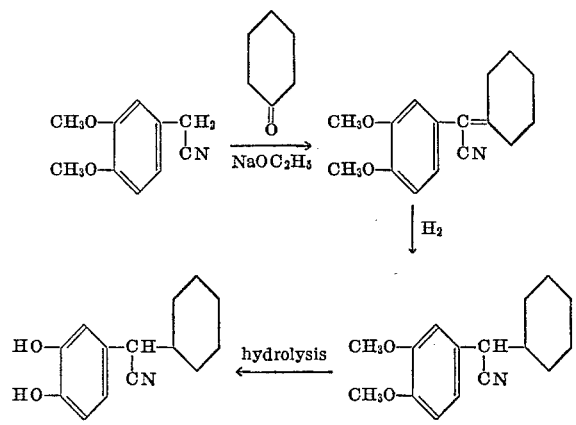

The first step, that is the treatment of the 3,4-disubstituted-phenylacetonitrile with the cycloalkyl ketone is advantageously carried out in an organic solvent, such as ethanol, under anhydrous conditions at reflux temperatures. The reaction proceeds rather quickly and usually is substantially complete in a reasonably short time.

Representative of the compounds which may be prepared in this manner are the following:

Cyclohexylidene-3,4-dimethoxyphenylacetonitrile,
(4-piperidylidene)-3,4-dimethoxyphenylacetonitrile,
(3-pyrrolidinylidene)-3,4-dimethoxyphenylacetonitrile,
(3-tetrahydrofurylidene)-3,4-dimethoxyphenylacetonitrile,
(3-tetrahydropyranylidene)-3,4-dimethoxyphenylacetonitrile,
(3-tetrahydrothiophenylidene)-3,4-dimethoxyphenylacetonitrile, and
(3-azacycloheptylidene)-3,4-dimethoxyphenylacetonitrile,
(3-thiacycloheptylidene)-3,4-dimethoxyphenylacetonitrile.

The second step, the hydrogenation of the cyclohexylidene-3,4-dimethoxyphenylacetonitrile to the corresponding cyclohexyl derivative is carried out in absolute ethanol in the presence of an excess of hydrogen and a 10% palladium on carbon catalyst.

Representative of the compounds which may be prepared in this manner are the following:

α-cyclohexyl-3,4-dimethoxyphenylacetonitrile,
α-(4-piperidyl)-3,4-dimethoxyphenylacetonitrile,
(3-azacycloheptylidene)-3,4-dimethoxyphenylacetonitrile,
α-(3-pyrrolidinyl)-3,4-dimethoxyphenylacetonitrile,
α-(3-tetrahydrofuryl)-3,4-dimethoxyphenylacetonitrile,
α-(3-tetrahydropyranyl)-3,4-dimethoxyphenylacetonitrile,
α-(3-tetrahydrothiophenyl)-3,4-dimethoxyphenylacetonitrile,
α-(3-azacycloheptyl)-3,4-dimethoxylacetonitrile, and
α-(3-azacycloheptyl)-3,4-dimethoxyphenylacetonitrile.

The third step, the hydrolysis of the α-cyclohexyl-3,4-dimethoxyphenylacetonitrile to the α-cyclohexyl-3,4-dihydroxyphenylacetonitrile is readily effected by forming a mixture of the starting material and pyridine hydrochloride and heating it in an oil bath, e.g. 3½ hours at 200°.

Representative of the compounds which may be prepared in this manner are the following:

α-cyclohexyl-3,4-dihydroxyphenylacetonitrile,
α-(4-piperidyl)-3,4-dihydroxyphenylacetonitrile,
α-(3-pyrrolidinyl)-3,4-dihydroxyphenylacetonitrile,
α-(3-tetrahydrofuryl)-3,4-dihydroxyphenylacetonitrile,
α-(3-tetrahydropyranyl)-3,4-dihydroxphenylacetonitrile,
α-(3-tetrahydrothiophenyl)-3,4-dihydroxyphenylacetonitrile,
α-(3-azacycloheptyl)-3,4-dihydroxyphenylacetonitrile, and
α-(3-thiacycloheptyl)-3,4-dihydroxyphenylacetonitrile.

Those compounds in which X and Y are aralkoxy may be prepared in the manner illustrated in the following diagram which shows the preparation of the simplest benzyloxy derivatives.

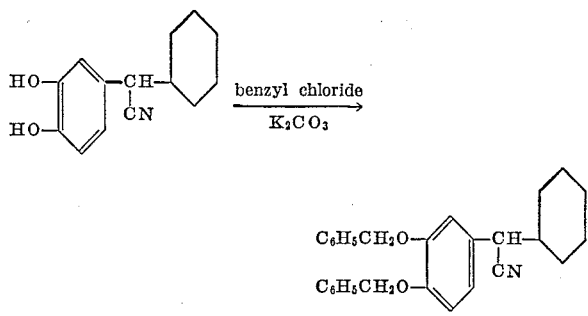

The benzyloxy derivatives serve as convenient starting materials for the preparation of the compounds of Formula II in which R is other than —CN. The following diagram serves to illustrate the preparation of such compounds.

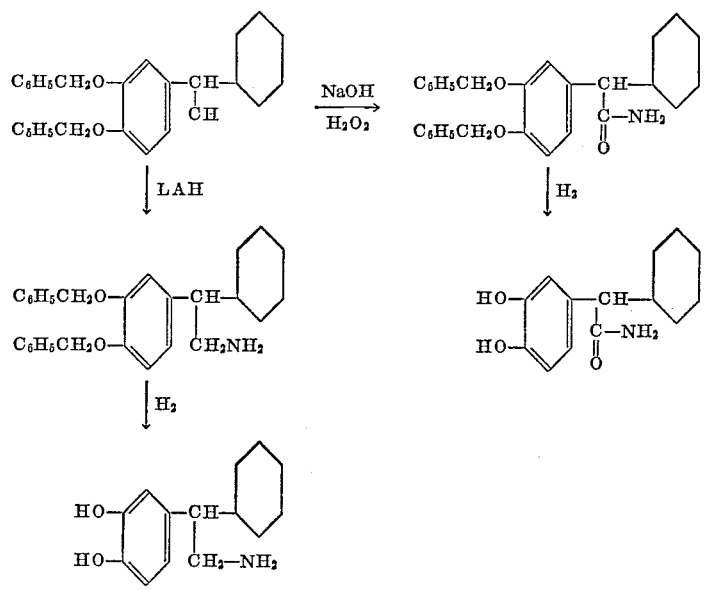

The reduction of the α-cyclohexyl-3,4-dibenzyloxyphenylacetonitrile to β-(cyclohexyl)-β-(3,4-dibenzyloxyphenyl)-ethylamine is advantageously affected by adding the nitrile to a dispersion of lithium aluminum hydride in ether, heating the resulting mixture at reflux until the reaction is substantially complete. The amine is then isolated by conventional procedures.

The resulting amine can then be converted to the β-(cyclohexyl)-β-(3,4-dihydroxyphenyl)ethylamine by treating the former compound with an excess of hydrogen in the presence of a suitable catalyst such as 10% palladium on carbon.

The α-cyclohexyl-3,4-dibenzyloxyphenylacetonitrile may be converted to the corresponding amide by treating it with hydrogen peroxide in the presence of sodium hydroxide and methanol. The resulting amide may be converted into the dihydroxy substituted amide, as shown in the above diagram, by treating the former compound with an excess of hydrogen in the presence of a suitable catalyst such as 10% palladium on carbon.

The foregoing description has been primarily for the purpose of illustration and it will be apparent that other compounds than those specifically mentioned may be prepared from the above teaching by those skilled in the art.

Other compounds which may be prepared are the following:

β-(4-piperidyl)-β-(3,4-dihydroxyphenyl)ethylamine,
β-(3-pyrrolidinyl)-β-(3,4-dihydroxyphenyl)ethylamine,
β-(3-tetrahydrofuryl)-β-(3,4-dihydroxyphenyl)ethylamine,
β-(3-tetrahydropyranyl)-β-(3,4-dihydroxyphenyl)ethylamine,
β-(3-tetrahydrothiophenyl)-β-(3,4-dihydroxyphenyl)ethylamine,
β-(3-azacycloheptyl)-β-(3,4-dihydroxyphenyl)ethylamine, and
β-(3-thiacycloheptyl)-β-(3,4-dihydroxyphenyl)ethylamine.

The compounds of the invention, since they possess a variety of functional groups, form a wide variety of acid and basic salts. The compounds and those salts which are nontoxic and pharmaceutically acceptable are CNS stimulants, antihypertensives and diuretics. In addition, they are useful intermediates in the preparation of complex pharmaceutical and chemical compounds.

The compounds can be administered to animals as pure compounds or in the form of pharmaceutically acceptable relationship, one or more of the compounds is generally combined with a suitable pharmaceutical carrier and made into unit dosage forms. These dosage forms may be made for oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin and disintegrating agents such as sodium carbonate in combination with citric acid may be employed in the formation of the tablets.

Unit dosage forms, such as tablets and capsules, may contain any suitable predetermined amount of one or more of the active ingredients as a nontoxic salt and may be administered one or more at a time at regular intervals. Such unit dosage forms, however, should generally contain a concentration of 0.1% to 10% by weight of one or more of the active agents. Such unit dosage forms should advisably contain about 5 to 150 mg. of the active ingredients.

The following examples are presented to illustrate this invention:

EXAMPLE 1

Cyclohexylidene-3,4-dimethoxyphenylacetonitrile

To a solution of 6.45 g. (0.28 mole) of sodium in 350 ml. of absolute alcohol is added 50 g. (0.28 mole) of 3,4-dimethoxyphenylacetonitrile and 13.9 g. (0.14 mole) of cyclohexanone. The reaction mixture is allowed to reflux for 1 hour, and then cooled and added to 1 liter of ice-water. The mixture is extracted with ether, the extracts dried, and the solvent distilled in vacuo to yield a viscous liquid which is crystallized from dilute ethyl alcohol to give upon recrystallization cyclohexylidene-3,4-dimethoxyphenylacetonitrile, a white crystalline solid, M.P. 82–84°.

Analysis.—Calcd. for $C_{16}H_{19}NO_2$: N, 5.45. Found: N, 5.49.

EXAMPLE 2

α-Cyclohexyl-3,4-dimethoxyphenylacetonitrile

To a solution of 10.0 g. (0.04 mole) of cyclohexylidene-3,4-dimethoxyphenylacetonitrile in 250 ml. of absolute ethanol is added 1.0 g. of 10% palladium on carbon and the mixture shaken with hydrogen (58 p.s.i.) until the theoretical amount of hydrogen (3.2 p.s.i.) has been taken up in 10 minutes. The catalyst is removed by filtration and the filtrate reduced in vacuo to yield a clear syrup which is crystallized from ethanol to yield α-cyclohexyl-3,4-dimethoxyphenylacetonitrile, a white crystalline solid, M.P. 84–86°.

Analysis.—Calcd. for $C_{16}H_{21}NO_2$: N, 5.40. Found: N, 5.41.

EXAMPLE 3

α-Cyclohexyl-3,4-dihydroxyphenylacetonitrile

A mixture of 5.0 g. (0.019 mole) of α-cyclohexyl-3,4-dimethoxyphenylacetonitrile and 13.9 g. (0.12 mole) of pyridine hydrochloride is heated in an oil bath for 3½ hours at 200–220°. The clear solution is poured into 200 ml. of ice-water, and the resulting solid collected and crystallized from 50% isopropanol to yield α-cyclohexyl-3,4-dihydroxyphenylacetonitrile, a white powder, M.P. 172–173.5°.

Analysis.—Calcd. for $C_{14}H_{17}NO_2$: N, 6.06. Found: N, 6.22.

EXAMPLE 4

α-Cyclohexyl-3,4-dimethoxyphenylacetamide

To a solution of 2.4 g. (0.06 mole) of sodium hydroxide in 5 ml. of water is added 7.4 g. (0.028 mole) of α-cyclohexyl-3,4-dimethoxyphenylacetonitrile dissolved in 80 ml. of methanol. The mixture is stirred 0.5 hour after which a clear solution is obtained. Hydrogen peroxide (15 ml., 30%) is then added dropwise in 10 minutes and the solution is stirred for 16 hours at room temperature. The reaction mixture is diluted with 350 ml. of water and cooled. The solids are collected and dried to yield α-cyclohexyl-3,4-dimethoxyphenylacetamide, a white solid, M.P. 163–165°.

Analysis.—Calcd. for $C_{16}H_{23}NO_3$: N, 5.05. Found: N, 5.37.

EXAMPLE 5

α-Cyclohexyl-3,4-dibenzyloxyphenylacetonitrile

A mixture of 45.8 g. (0.2 mole) of α-cyclohexyl-3,4-dihydroxyphenylacetonitrile, 56.6 ml. (62.5 g., 0.5 mole) of benzyl chloride and 77 g. (0.56 mole) of potassium carbonate in 1 liter of ethanol is refluxed for 4 hours, and filtered while warm and cooled. The crystalline solid is collected and recrystallized from 700 ml. of methanol to yield α-cyclohexyl-3,4-dibenzyloxyphenylacetonitrile, a white crystalline solid, M.P. 90–92°.

Analysis.—Calcd. for $C_{28}H_{29}NO_2$: C, 81.74; H, 7.08; N, 3.40. Found: C, 81.41; H, 7.33; N, 3.72.

EXAMPLE 6

α-Cyclohexyl-3,4-dibenzyloxyphenylacetamide

To a solution of 0.85 g. (0.02 mole) of sodium hydroxide in 2 ml. of water is added a slurry of 4.1 g. (0.01 mole) of α-cyclohexyl-3,4-dibenzyloxyphenylacetonitrile in 40 ml. of methanol. The mixture is heated to 50° and 8 ml. of 30% hydrogen peroxide is added in 5 minutes. The temperature is maintained at 50° for 10 hours and at room temperature for 7 hours. The mixture is diluted with 400 ml. of water, cooled and the solids collected, washed with water and recrystallized once from methanol and twice from ethanol to yield α-cyclohexyl-3,4-dibenzyloxyphenylacetamide, a light white solid, M.P. 197–198°.

Analysis.—Calcd. for $C_{28}H_{31}NO_3$: C, 78.29; H, 7.28; N, 3.26. Found: C, 78.50; H, 7.17; N, 3.42.

EXAMPLE 7

α-Cyclohexyl-3,4-dihydroxyphenylacetamide

To a solution of 11.5 g. (0.027 mole) of α-cyclohexyl-3,4-dibenzyloxyphenylacetamide in 250 ml. of absolute alcohol is added 0.5 g. of 10% palladium on carbon. The mixture is shaken with hydrogen (21.4 p.s.i.) until the theoretical amount (4.4 p.s.i.) has been taken up in 1 hour. The catalyst is removed by filtration and the filtrate reduced in vacuo to yield a light red glass which is dissolved in 300 ml. of ether and filtered to remove the insoluble material. The filtrate is treated with activated carbon and concentrated to yield α-cyclohexyl-3,4-dihydroxyphenylacetamide, a white glass, M.P. 77°.

Analysis.—Calcd. for $C_{14}H_{19}NO_3$: C, 67.45; H, 7.68; N, 5.62. Found: C, 66.80; H, 7.98; N, 5.22.

EXAMPLE 8

β-(Cyclohexyl)-β-(3,4-dibenzyloxyphenyl)ethylamine hydrochloride

To a dispersion of 1.94 g. (0.051 mole) of lithium aluminum hydride in 50 ml. of ether is added 7 g. (0.017 mole) of α-cyclohexyl-3,4-dibenzyloxyphenylacetonitrile in 200 ml. of ether in 15 minutes. The mixture is stirred at room temperature for 2 hours and refluxed for 8 hours. The complex is decomposed with 10 ml. of water and the solids removed by filtration. The filtrate is dried and adjusted to acidity by the addition of ethereal hydrogen chloride. The precipitated solid is collected and recrystallized from methanol to yield β-(cyclohexyl)-β-(3,4-dibenzyloxyphenyl)ethylamine hydrochloride, a light textured white solid, M.P. 208–210°.

Analysis.—Calcd. for $C_{28}H_{34}ClNO_2$: C, 74.40; H, 7.58; N, 3.10. Found: C, 74.40; H, 7.72; N, 2.98.

EXAMPLE 9

β-(Cyclohexyl)-β-(3,4-dihydroxyphenyl)ethylamine hydrochloride

To a solution of 3.05 g. (0.0068 mole) of β-(cyclohexyl)-β-(3,4-dibenzyloxyphenyl)ethylamine hydrochloride in 200 ml. of ethanol is added 0.5 g. of 10% palladium on carbon. The mixture is shaken with hydrogen (40.2 p.s.i.) until the theoretical amount (0.55 p.s.i) has been taken up in 5 hours. The catalyst is removed by filtration and the filtrate concentrated to yield a glossy solid which is dried thoroughly in vacuo at room temperature to yield β-(cyclohexyl)-β-(3,4-dihydroxyphenyl)ethylamine hydrochloride, a grey-white powder, MP. 71°.

Analysis.—Calcd. for $C_{14}H_{22}ClNO_2$: C, 61.86; H, 8.16; Cl, 13.05; N, 5.16. Found: C, 61.68; H, 8.07; Cl, 13.02; N, 4.85.

We claim:
1. A compound selected from compounds having the formula

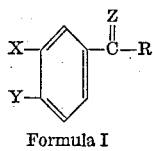 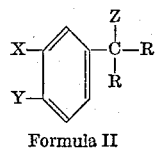

Formula I      Formula II in which X and Y are hydroxy, methoxy, ethoxy, propoxy, and benzyloxy; R is

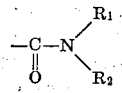

$R_1$ and $R_2$ are hydrogen; and Z is cyclohexyl.
2. α-cyclohexyl-3,4-dimethoxyphenylacetamide.
3. α-cyclohexyl-3,4-dibenzyloxyphenylacetamide.
4. α-cyclohexyl-3,4-dihydroxyphenylacetamide.

References Cited

Smith et al.: Chemical Abstracts, vol. 54, p. 24533 f.
Smith et al.: Journal of Organic Chemistry, vol. 24, pp. 1301–1309.
Salmon-Legagneur et al.: Chemical Abstracts, vol. 62, p. 16103 f.
Jilek et al.: Chemical Abstracts, vol. 51, p. 14596 b.
Carlsson et al.: Helvetica Chimica Acta, vol. 46, No. 6, pp. 2271–2285 (1963).

CHARLES B. PARKER, *Primary Examiner.*

S. T. LAWRENCE III, *Assistant Examiner.*

UNITED STATES PATENT OFFICE
CERTIFICATE OF CORRECTION

Patent No. 3,408,396                                            October 29, 1968

John T. Suh et al.

It is certified that error appears in the above identified patent and that said Letters Patent are hereby corrected as shown below:

Column 2, line 52, beginning with "α-cyclohexyl-3," cancel all to and including "-3,4-dimethoxyphenylacetonitrile." in lin 65, same column 2, and insert the following:

α-cyclohexyl-3,4-dimethoxyphenylacetonitrile,
α-(4-piperidyl)-3,4-dimethoxyphenylacetonitrile,
α-(3-pyrrolidinyl)-3,4-dimethoxyphenylacetonitrile,
α-(3-tetrahydrofuryl)-3,4-dimethoxyphenylacetonitrile,
α-(3-tetrahydropyranyl)-3,4-dimethoxyphenylacetonitrile,
α-(3-tetrahydrothiophenyl)-3,4-dimethoxyphenylacetonitrile,
α-(3-azacycloheptyl)-3,4-dimethoxyphenylacetonitrile, and
α-(3-thiacycloheptyl)-3,4-dimethoxyphenylacetonitrile.

Column 3, lines 36 to 45, the left-hand portion of the formula should appear as shown below:

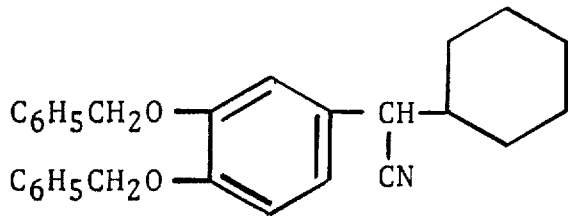

Column 4, line 1, cancel "salts. However, to obtain a more practical size to dosage"; line 28, "vide" should read -- wide --; line 35, after "acceptable" insert -- salts. However, to obtain a more practical size to dosage --. Column 7, formula I] should appear as shown below:

(2)

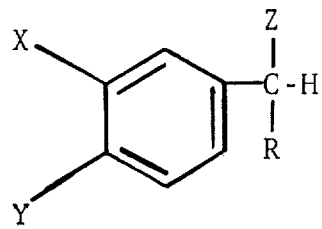

Signed and sealed this 24th day of February 1970.

(SEAL)
Attest:

EDWARD M. FLETCHER, JR.
Attesting Officer

WILLIAM E. SCHUYLER, JR.
Commissioner of Patents